No. 882,119. PATENTED MAR. 17, 1908.
O. OHLSSON.
LINER FOR CENTRIFUGAL SEPARATORS.
APPLICATION FILED FEB. 26, 1902. RENEWED MAY 10, 1904.
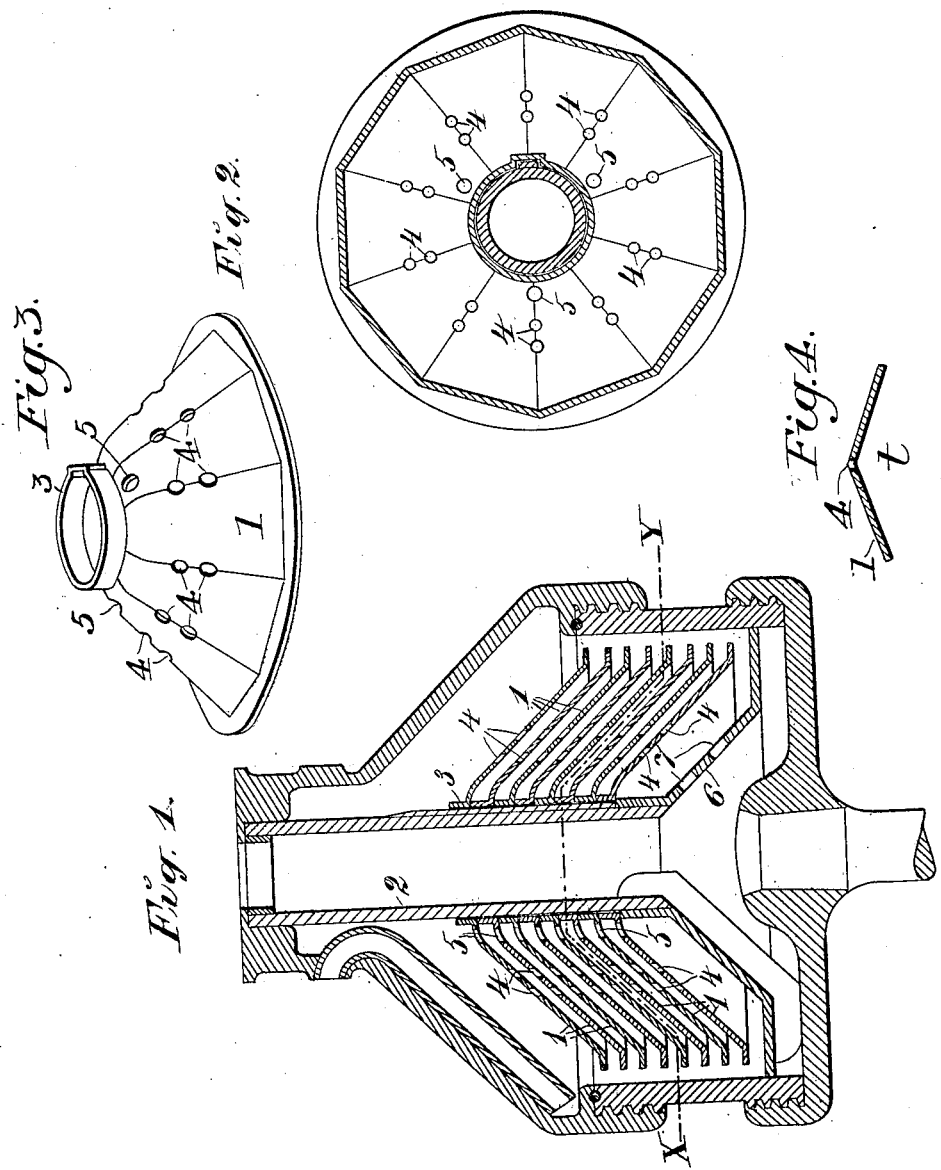
WITNESSES:
INVENTOR
Olof Ohlsson
BY
ATTORNEY

UNITED STATES PATENT OFFICE.

OLOF OHLSSON, OF SÖDERTELJE, SWEDEN, ASSIGNOR, BY MESNE ASSIGNMENTS, TO EMPIRE CREAM SEPARATOR COMPANY, OF BLOOMFIELD, NEW JERSEY, A CORPORATION OF NEW JERSEY.

LINER FOR CENTRIFUGAL SEPARATORS.

No. 882,119.

Specification of Letters Patent. Patented March 17, 1908.

Application filed February 26, 1902. Serial No. 95,719. Renewed May 10, 1904. Serial No. 207,300.

*To all whom it may concern:*

Be it known that I, OLOF OHLSSON, a citizen of the United States of America, residing in Södertelje, in the Kingdom of Sweden, have invented certain new and useful Improvements in Liners for Centrifugal Apparatus, of which the following is a specification.

This invention relates to the class of removable liners inserted in centrifugal drums, and made up of superposed pyramidal or conical plates or disks.

The object of the invention is to provide a liner composed of such plates or disks provided with means for distributing the full milk between the plates without interfering with the flow of the separated cream or blue milk and to provide means for guiding and directing the flow of the full milk.

In the accompanying drawings, which illustrate the preferred embodiment of the invention—Figure 1 is an axial, vertical section of a drum and liner embodying the invention; Fig. 2 is a horizontal section of the liner along the line X Y in Fig. 1; Fig. 3 is a perspective view of one of the plates, detached, and Fig. 4 is a vertical section through a plate, showing the radial angle forming the guiding channel or inverted trough.

Referring to the preferred form of my invention shown in the drawings the plates or disks 1, are separable and are apertured at the center to slip down over the inlet or milk tube 2, and have collars 3 to space them when superposed. These plates are of a general conical or pyramidal form and each plate preferably extends from the central feed pipe, or milk tube 2 substantially across the space of the bowl. In the form shown these plates are pyramidal in form, thus providing radial salient angles on the upper side of the plate along the lines where the faces or walls of the pyramid meet at their lateral edges and corresponding radial channels on the underside of said plate.

In the plates are provided apertures for the flow of the full milk from plate to plate. In the form shown they consist of holes 4 arranged along the said radial channels. The apertures in the different plates are preferably arranged in line with one another to permit a ready flow of full milk from plate to plate. Any desirable number of sets of holes 4 may be employed. I have shown two sets in each plate. Near the central opening in the plate are holes 5 for the escape of the cream. The detail view, Fig. 4, shows the radial channels $t$, clearly. Any suitable means may be employed for bringing the full milk into line with said apertures. In the form shown in the drawing the full milk to be separated enters the drum through the inlet or milk tube 2, which is closed except at the top and bottom, and flows upward in and is brought into line with the apertures or holes 4 up through which it flows to be distributed between the plates 1 above. As the milk rises the cream gathers near the drum-axis, and the blue milk is driven outward toward the periphery. The holes 4 may be arranged at any suitable point radially of the plates but preferably are about equidistant from the center of the plates substantially along the neutral line of the milk; that is along the line where the milk is normal, or has the density of full milk. In this way the full milk, prior to its separation into cream and blue milk, is distributed between the plates for purposes of subsequent separation into its constituent elements. The function of the channels $t$ is to guide or compel the flow of the liquid to the apertures 4. In Figs. 1 and 2 there are two concentric series of holes 4, one series being a little farther from the center than the other. It will be noted that in the construction illustrated the inclined under surfaces of the plates, gather the milk and guide or direct it to the apertures 4.

Preferably the plates will be placed, as indicated, with the corresponding parts of the same situated directly in line vertically, but this is not essential to the invention. The plates in the particular form shown in the drawings have the form of low or flattened pyramids disposed one over the other, the spaces between said plates extending, without a break, from a point more or less near the drum-axis to the peripheries of the plates, said spaces conforming to the pyramidal form of the plates; the aperture formed in the plates for the full milk are shown at 4 preferably arranged along the guiding channels formed in the plates, which channels extend out substantially radially from the drum-axis for leading the full milk toward the axis of the drum.

Having thus described my invention, what

I claim as new and desire to secure by Letters Patent is:

1. A liner for a centrifugal separating apparatus, consisting of a plurality of superposed and spaced plates, said plates having each the form of a relatively low pyramid, and each having apertures for the upward flow of the liquid through the plate, said apertures being situated at the radial angles formed by the meeting lateral edges of the faces of the pyramidal plate, substantially as and for the purpose set forth.

2. A liner for a centrifugal separating apparatus, consisting of a plurality of superposed and spaced plates of general pyramidal shape, each of said plates having radially extending guiding channels on its underside, and apertures for the passage of the liquid through the plate, the said apertures being situated at the respective channels, whereby the latter serve to gather the liquid and guide it to the apertures.

In witness whereof, I have hereunto signed my name in the presence of two subscribing witnesses.

OLOF OHLSSON.

Witnesses:
 ERNST SVANGVIST,
 AUG. SÖRENSEN.